Jan. 16, 1934. O. H. BANKER 1,943,293
AUTOMATIC CHANGE SPEED TRANSMISSION
Filed July 24, 1931 6 Sheets-Sheet 2

INVENTOR
Oscar H. Banker
BY Quarles & French
ATTORNEYS

Jan. 16, 1934. O. H. BANKER 1,943,293
AUTOMATIC CHANGE SPEED TRANSMISSION
Filed July 24, 1931 6 Sheets-Sheet 3

INVENTOR
Oscar H. Banker
BY Quarles & French
ATTORNEYS

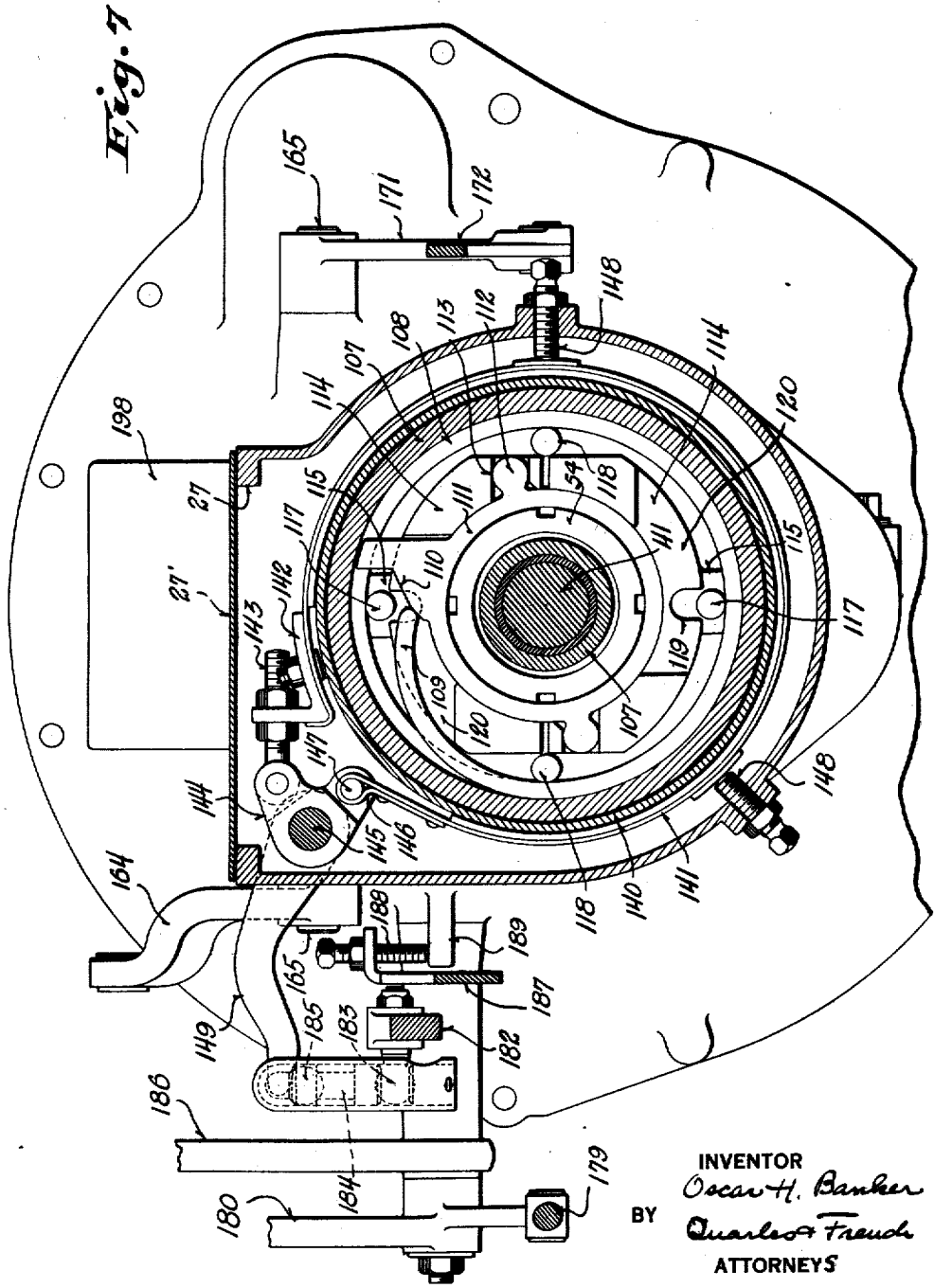

Jan. 16, 1934.        O. H. BANKER        1,943,293
AUTOMATIC CHANGE SPEED TRANSMISSION
Filed July 24, 1931        6 Sheets—Sheet 5
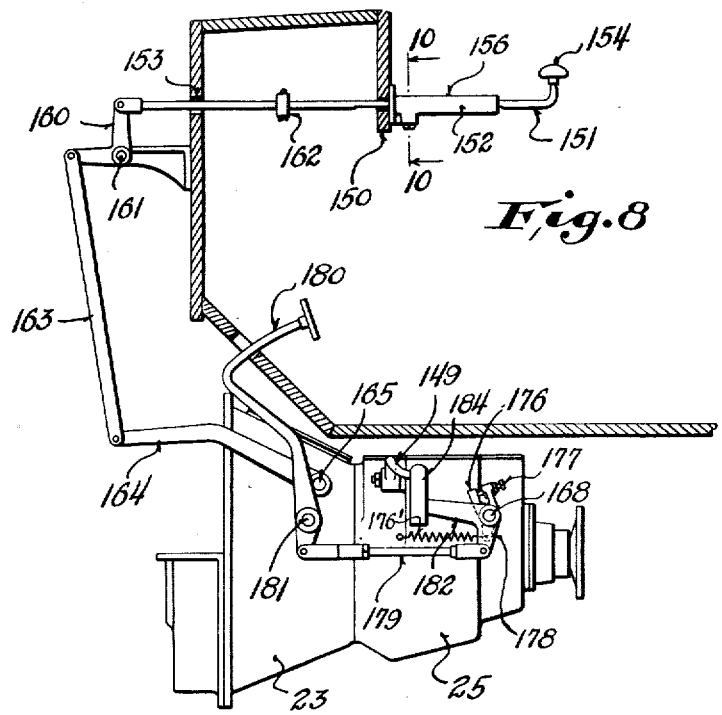
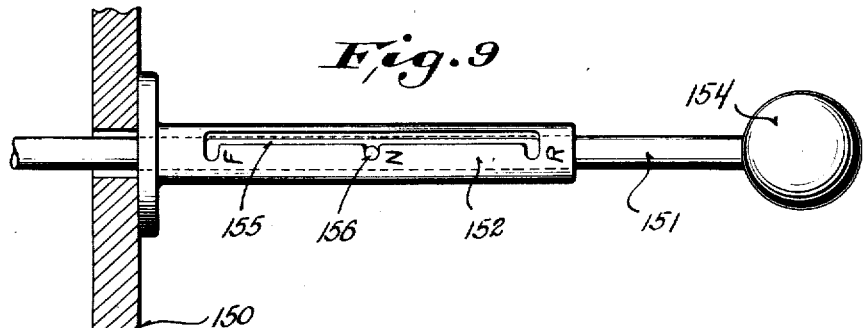
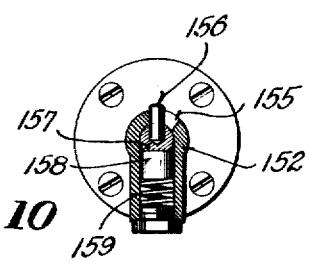
INVENTOR
Oscar H. Banker
BY Quarles & French
ATTORNEYS

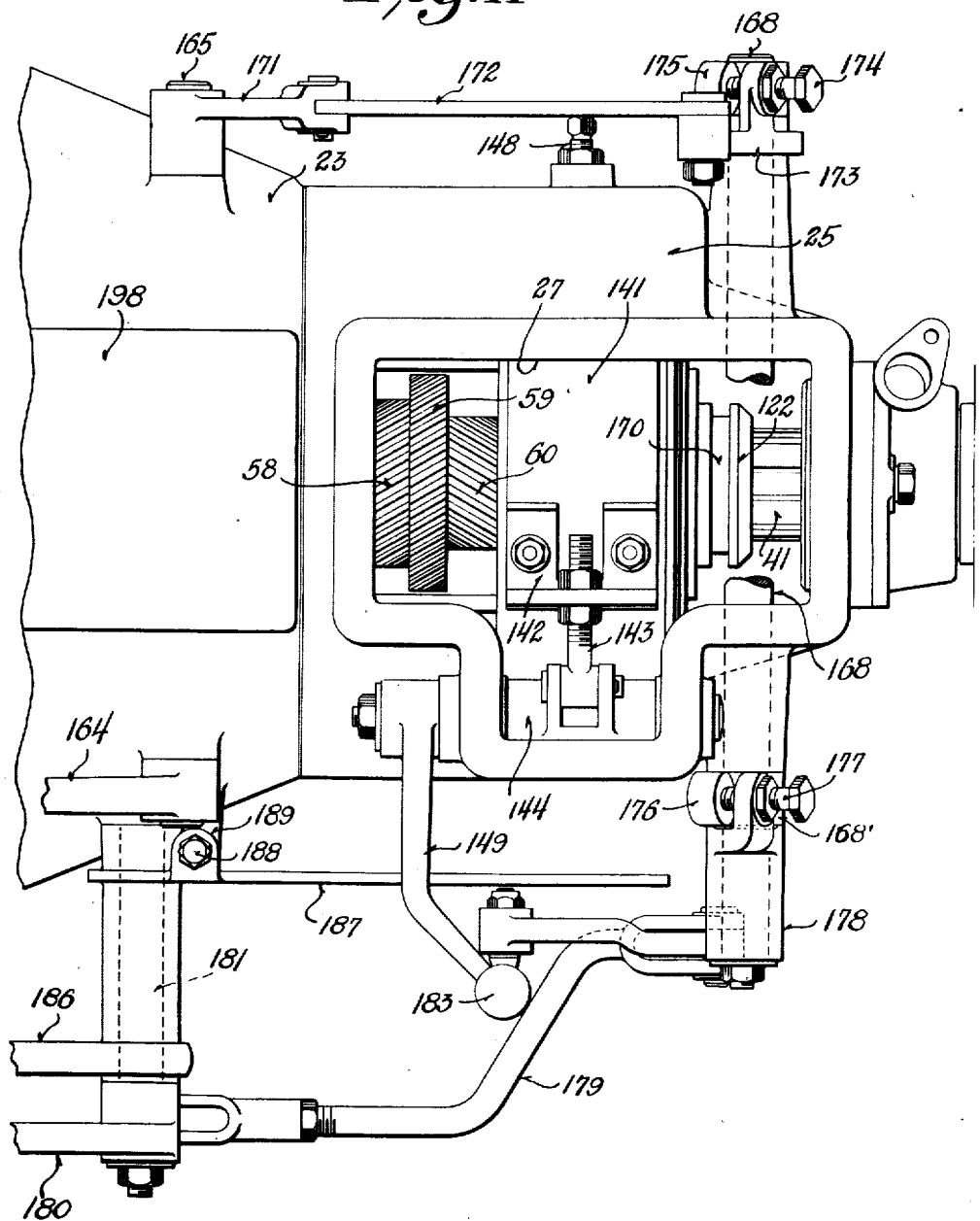

Patented Jan. 16, 1934

1,943,293

UNITED STATES PATENT OFFICE 1,943,293

AUTOMATIC CHANGE SPEED TRANSMISSION

Oscar H. Banker, Chicago, Ill., assignor to New Products Corporation, Chicago, Ill., a corporation of Delaware Application July 24, 1931. Serial No. 552,860

10 Claims. (Cl. 74—34)

The invention relates to automatic change speed transmissions and more particularly to those of the planetary gear type.

In my prior applications, Ser. No. 472,125 filed July 31, 1930 and Ser. No. 515,219 filed February 12, 1931, I have shown and described a change speed transmission of the type above described wherein three changes in speed and reverse can be effected from a single epicyclic gear unit and wherein the transmission has two drive shafts associated with the planetary gear unit for this purpose. The present invention embodies the general gear arrangement of these prior applications and has for one of its objects to provide an automatic clutch of the coiled spring type for the second speed gearing connection suggested but not shown or claimed in said application Ser. No. 515,219 and to thus improve upon the construction therein claimed by eliminating the chances for a succession of grabbing impulses that have been found to occur with the centrifugal second speed clutches of these applications.

A further object is to eliminate the geared connection between the planetary geared carrier and the one-way automatic brake mechanism therefor of these applications and associate the automatic brake in a simple, efficient and novel manner with the planetary gear carrier and also in such a way that said carrier may revolve freely in neutral and reverse.

A further object is to provide means for locking the second speed clutch mechanism out of operation in the neutral position of the transmission so that when the engine is raced in neutral this clutch mechanism is not operated thereby preventing a drag in the transmission which in practice has been shown to occur in previous designs and which produces a tendency of the vehicle to creep.

A further object is to provide an automatic brake mechanism for the planetary gear carrier including brake members, and a rotary member operated by speed responsive means to release said member when the carrier is revolving with the driven shaft during direct drive to prevent wear on said brake members.

A further object of the invention is to provide a simple and positive direct acting brake mechanism for the planetary gear carrier to hold the same when the engine is used as a brake and also to use the same when the transmission is in neutral and it is desired to utilize the full torque of the engine in getting the vehicle out of a bad hole or other difficult ground condition.

A further object of the invention is to provide a lost motion connection between the transmission and the no roll back brake mechanism so that the controls for putting the transmission into reverse will not be prevented from free operation under conditions met with in service.

A further object of the invention is to provide a second speed coiled spring clutch that is attached directly to the fly wheel so that the main engine clutch is only effective in the low gear ratio and so that when in the second or high speed ratios the torque from the engine is transmitted directly through the spring clutches whose gripping action increases with the pull placed on them.

The invention further consists in the several features hereinafter set forth and more particularly claimed at the conclusion hereof.

Referring to the drawings, Fig. 1 is a vertical sectional view taken through the housing of the transmission with the lower half of most of the rotating parts shown in full while the upper half shows a central vertical section through the transmission mechanism.

Fig. 7 is a detail vertical sectional view taken on the line 7—7 of Fig. 1;

Fig. 8 is a side elevation view of the transmission embodying the invention showing its installation in an automotive vehicle;

Fig. 9 is a detail plan view of one of the controls;

Fig. 10 is a detail sectional view taken on the line 10—10 of Fig. 8;

Fig. 11 is a plan view of the transmission embodying the invention, parts being broken away;

Figure 1:
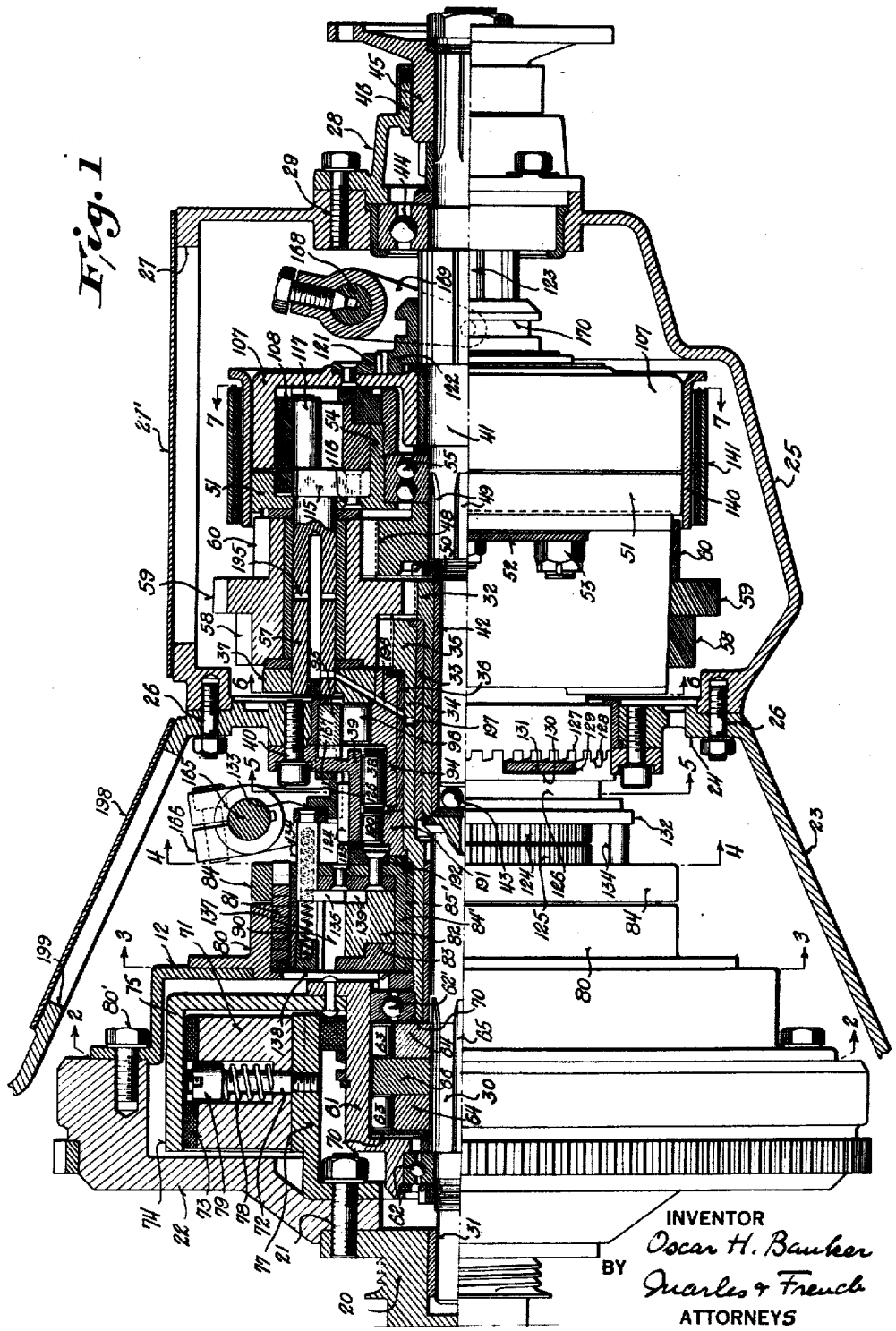

Referring to the drawings, and more particularly to Fig. 1, the numeral 20 designates the engine drive shaft or crank shaft of the engine connected by bolts 21 to the fly wheel 22 of the engine enclosed in the usual engine crank case to which a housing section 23 of the transmission is detachably secured in any suitable manner, said section 23 having an end plate portion 24 to which the casing section 25 is secured by bolts 26. Section 25 has an opening 27 in the top covered by a removable cover plate 27' and has a coupling housing 28 secured to the end thereof by bolts 29.

A drive shaft 30 has one end journalled in the bushed bore 31 of the crank shaft and has a gear 32 at its other end formed integral therewith or connected thereto and at this end is journalled in the bushed bore 33 of the hollow or tubular drive shaft 34, provided with a gear 35 and in turn journalled in a bearing 36 of the part 37 of the planet gear carrier, which part in turn has a hub portion journalled in the roller bearing 38 whose rollers are mounted within a retainer ring 39 having a flange or lug portions 131 secured to the end plate 24 by bolts 40.

A driven shaft 41 has one end journalled in the bushed bore 42 in the shaft 30 and spaced from the inner end of said bore by a ball thrust bearing 43 and its other end journalled in the ball bearing 44 on the outer end of section 25 and has a propeller shaft coupling flange 45 splined to it and extending loosely through the end 46 of the housing 28.

The shaft 41 has a driven gear 48 splined to it, as at 49 and secured against endwise movement in one direction by a suitably locked nut 50.

Figures 4, 6:
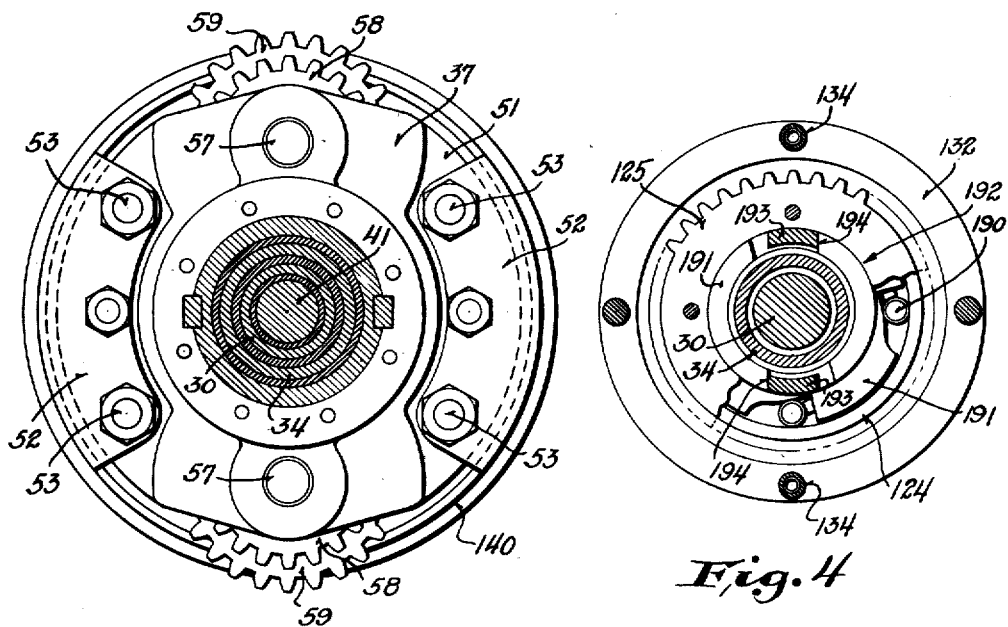
Fig. 4 is a detail vertical sectional view taken on the line 4—4 of Fig. 1.
Fig. 6 is a detail vertical sectional view taken on the line 6—6 of Fig. 1.

The planetary gear carrier in addition to the part 37 includes a spider or flanged disk 51 which is secured to the part 37 by stud bolts 53, see Figs. 1 and 6. The hub 54 of the disk 51 is journalled on a ball bearing journal 55 whose inner race is mounted on the driven shaft 41.

The parts 37 and 51 have planet shafts 57 secured thereto on which the planet gears 58, 59 and 60 are mounted, these gears preferably being integrally formed compound gears with bushed hubs and meshing respectively with the gears 35, 32 and 48.

With the above arrangement, low speed is obtained when the gear 32 is the driver and the planet gear is held against rotation, the drive then being from the shaft 30 through gears 32, 59, 60 and 48 to the driven shaft 41; second speed when the gear 35 is the driver and the planet gear carrier is held against rotation, the drive then being from the shaft 34, through gears 35, 58, 60 and 48; high speed when the planet carrier and its gears revolve with the shafts 30 and 34; and reverse is obtained when the planetary gear carrier is allowed to rotate freely and the shaft 34 held against rotation while the gear 32 meshing with gear 59 drives the planetary gear carrier around gear 35 in an anti-clockwise direction and thus through the gear 60 drives the gear 48 and the shaft 41 in the reverse direction to that of the shaft 30.

For obtaining the drive from the shaft 20 to the shaft 34 I preferably employ a speed responsive clutch mechanism which is associated with an overrunning clutch comprising a clutch drum 61 whose hub is journalled at one side on the ball bearing journal 62 mounted between it and the shaft 30 and at the other on a ball bearing journal 62' whose inner race ring is mounted on the shaft 34. The overrunning clutch has two sets of clutch rollers 63 cooperating with the drum and with actuators 64 splined at 65 to the shaft 30 and separated by a spacer ring 66. As shown in detail in Fig. 2 in connection with one of the actuators, each actuator 64 has wedging recesses 67 formed therein and in which the rollers 63 work and are adapted to be wedged by the inclined or wedging surfaces 68 of said recesses into locked engagement therewith and with the drum in one direction of rotation and to be released from the drum in the event shaft 30 runs faster than drum 61, each of said rollers being normally urged toward clutched position by a spring pressed plunger 69. Plates 70 limit the endwise movement of the rollers 63.

Figure 2:
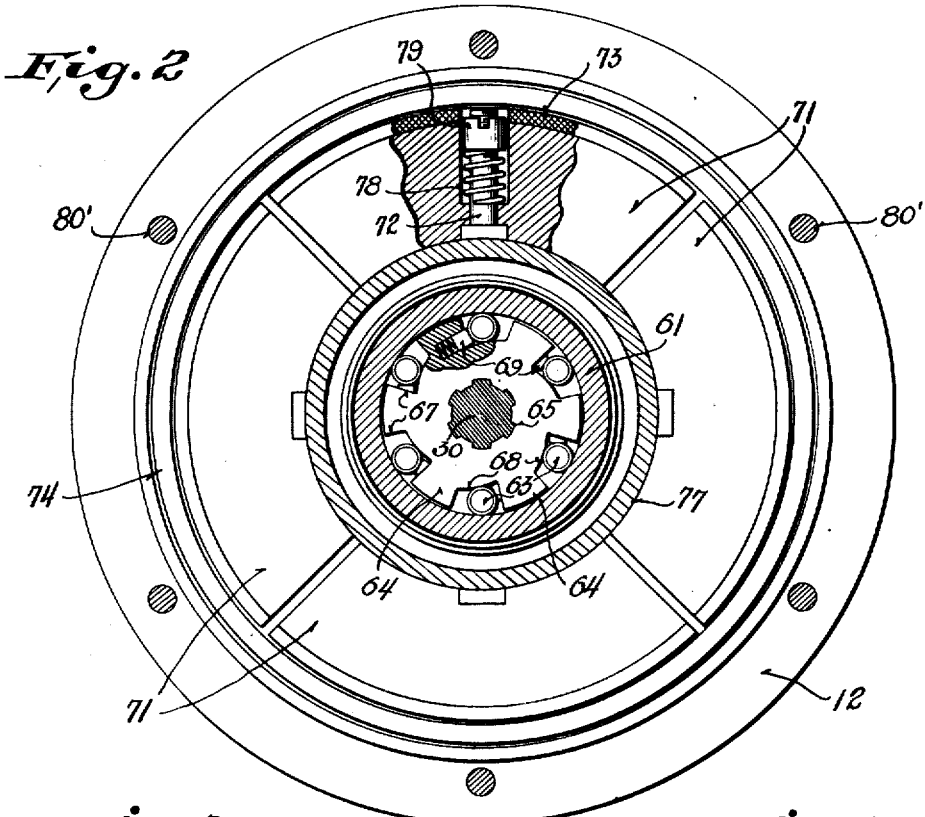
Fig. 2 is a detail vertical sectional view taken on the line 2—2 of Fig. 1.

For connecting the drum 61 with the shaft 20 any suitable clutch mechanism may be employed, but as previously stated an automatic clutch is preferred and as illustrative thereof, in Figs. 1 and 2. I show a clutch of the centrifugal type including the segmental weights or shoes 71, each of which is slidably mounted on a stud 72 and driven thereby and is provided with a clutch lining 73 engageable with a drum 74 whose disk portion 75 is secured, as by rivets, to a flange on the drum 61. The studs 72 are anchored at their inner ends on a spider or flanged disk 77 secured to the crank shaft 20 by bolts 21. The outward movement of the weights 71 under the action of centrifugal force is resisted in each instance by a spring 78 interposed between the weight and a tension adjusting nut 79 on the stud 72. When the engine is not running, the weights 71 are free, but after the engine has been started and the speed of the shaft 20 becomes such as to overcome the inertia of the shoes 71 and the pressure of the springs 78, said shoes move outwardly under the action of centrifugal force into driving engagement with the drum 74 and thus connect the drum 61 for rotary movement with the shaft 20 and this causes the rollers 63 to assume a driving position relative to said drum and the actuators 64 with the result that the shaft 30, and hence the gear 32, is then turned by the engine to drive the planetary gearing to provide the low or first speed drive.

While in low gear, the gear 58 being a part of the compound planet gears and in mesh with the gear 35 causes said gear 35 to turn in a clockwise direction at a higher speed than the gear 48 associated therewith and at a predetermined speed for example five to eight miles per hour car speed, causes the operation of the speed responsive clutch mechanism that connects the shaft 34 with the shaft 20 to obtain second speed through the epicyclic gear train as previously set forth, and permits of the automatic driving release of the shaft 30, through the overrunning action of the clutch roller 63.

Unlike the speed responsive second speed clutches of my prior developments, the present invention involves the incorporation of this design of a governor operated spring clutch mechanism which has the advantage of preventing an intermittent grabbing action found to occur in my previous design and which reduces the weight and number of parts and permits of the use of certain controls and advantages as hereinafter described.

Figure 3:
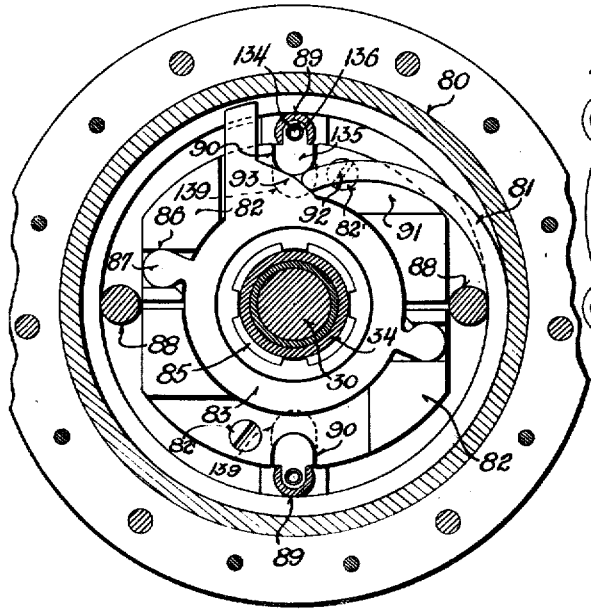
Fig. 3 is a detail vertical sectional view taken on the line 3—3 of Fig. 1.
Figure 12:
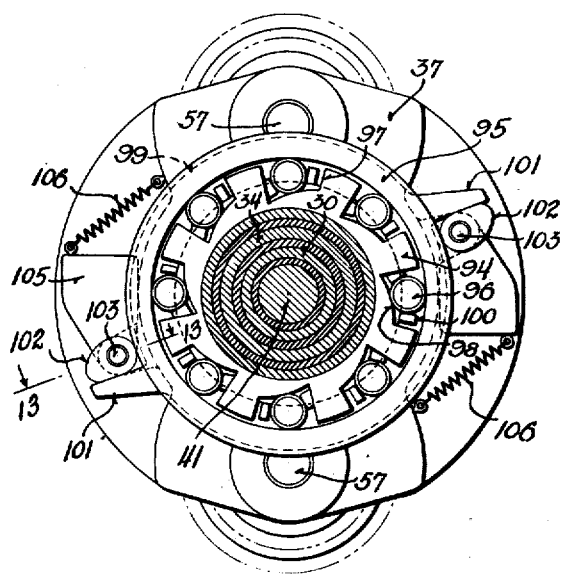
Fig. 12 is a vertical sectional view through a portion of the transmission showing certain modifications in the one way brake for the planetary carrier.

In the present construction the clutch 80 is bolted directly to the flange of the fly wheel 22 by bolts 80' so that when the vehicle is in second or high gear it is driven directly through the second speed clutch from the engine. The coiled spring clutch element 81 is adapted to be engaged with said drum to establish the drive from the engine directly to the shaft 34 through speed responsive elements 82 and an equalizer 83. One end of the clutch spring element is anchored on a flanged disk 84 whose hub 84' is splined at 85 on the shaft 34 and upon which the equalizer 83 is free to turn under the action of the elements or weights 82 which have a sliding and a pivotal connection through slots 86 with the diametrically disposed rounded projections 87 of the equalizer. The weights 82 are suitably guided to move outwardly along the face of the disk 84 and are restrained against movement until the desired speed has been obtained by the usual governor springs (not shown) associated therewith and normally resisting their outward movement. These weights are also normally restrained against movement to prevent hunting by spring pressed detents more particularly shown in Fig. 12 of my application Ser. No. 515,219 and the plugs 82' for the springs of these detents are shown in Fig. 3. The spring 82 is retained in release position by diametrically disposed pins 88 and another set of guides 89 projecting from the disk 84 or parts thereof. The weights 82 have slots 90 affording clearance for the guides 89 and also clearance slots 91, one of which allows the free end 92 of the spring to engage a cam projection 93 on the equalizer.

With this construction when the speed of the drive shaft 34 reaches a certain value the weights 82 move outwardly against the action of their restraining springs and this outward movement acts through the connections 86, 87 to turn the equalizer toward the right as viewed in Fig. 3 and thus press outwardly against the end 92 of the spring 81 and thus move the coils of said spring into clutched engagement with the drum 80 so that the shaft 34 is then driven direct from the engine and through gears 35, 58, 60 and 48 establishes the second speed radio for the driven shaft 41.

Figure 5:
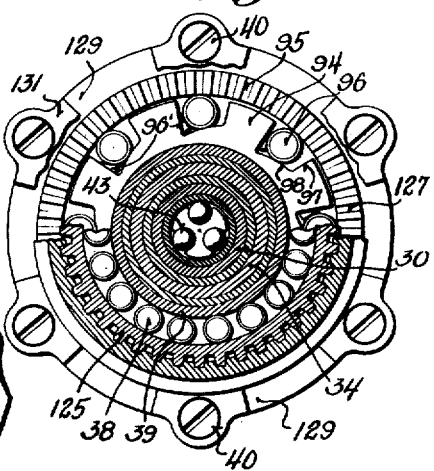
Fig. 5 is a detail vertical sectional view taken on the broken line 5—5 of Fig. 1.
Figure 13:
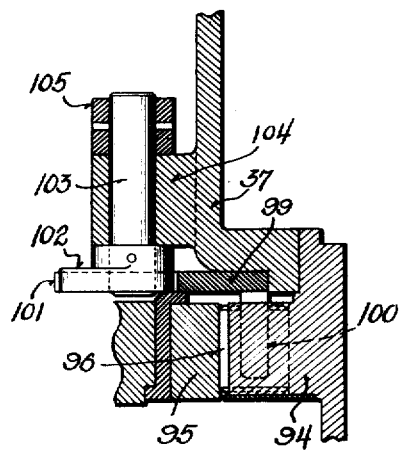
Fig. 13 is a detail sectional view taken on the line 13—13 of Fig. 12.

In the condition of low and second speed as the change speed gear is of the planetary gear type there is a tendency for the planetary gear carrier to be revolved in the reverse direction to the driven gear and means are provided herein to utilize this tendency to automatically lock the planetary gear carrier against reverse movement which means are shown more particularly in Figs. 1 and 5 as a one way roller brake which in the present instance is designed to act directly on the planetary carrier yet is readily released or rendered inoperative when the transmission is in neutral or reverse. This mechanism includes a cam member or actuator 94 formed as a part of the hub of the planetary gear carrier, a brake drum 95 and the brake members or rollers 96 which are mounted to work in notches 97 in the actuator 94 and cooperate with the inclined surfaces 98 thereof in the usual manner to cause the rollers to be wedged between said actuator and the brake drum on the tendency of the planetary carrier to rotate backwards or anti-clockwise as viewed in Fig. 5 and thus stop this backward rotation, the rollers being urged to locking engagement by spring pressed pins 96' similar to the pins 69. However, it will be noted that where the planetary gear carrier is rotated in a clockwise direction by the driven member, it will release the rollers 96 from their braking engagement with drum 95 which for the description thus far will be considered as stationary. From Fig. 1 will be noted that the design of this one-way brake is such that the diameter of the drum is relatively small and less than the distance between the centers of the shafts of the planet gears and this will reduce the chances for any appreciable wear on the parts of the brake mechanism, but to further reduce these chances the construction shown in Figs. 12 and 13 may also be used wherein a cage member 99 is mounted on the planetary carrier and includes a ring having projections 100 working in the notches 97 and adapted on the oscillation of the cage to simultaneously move said rollers to a release position free of the drum 95. For this purpose the cage has projections 101 each engageable with a cam 102 mounted on a shaft 103 journalled in a lug 104 formed on the planetary carrier, said shaft having a weight 105 mounted at its opposite end normally restrained against movement by a spring 106 but which under the high speed operation, when the carrier is revolving with the drive and driven shafts, moves outwardly under the action of centrifugal force so that the shafts 103, cam 102 are turned to oscillate the cage 99 to cause it to release the rollers 96.

Thus, with the present construction while in low gear, the gear 58 causes the gear 35 to turn in clockwise direction at a higher speed than the gear 48 and when the speed of the gear 35, its shaft 34, disk 84 and weights 82 reach a predetermined value, said weights act through equalizer 83 to engage spring clutch 81 with the drum 80 and the drive then being from the shaft 20 to the shaft 34, the gear 35 begins to revolve at engine speed and therefore gears 58, 59 and 60 revolve at a higher speed and consequently gear 48 and shaft 41 are driven at a higher or second speed. Under these conditions gear 59 being of larger diameter and revolving at a higher rate of speed at this instance causes gear 32 to revolve faster than engine speed and such increase in speed relatively speaking, being the same as running the drum 61 backwards or in a counter-clockwise direction, the rollers 63 of the overrunning clutch are released and, while shaft 30 is free to turn, the drive is from the engine through the second speed clutch, gears 35, 58, 60 and 48 to the shaft 41 with the vehicle in second speed.

It has been noted that the automatic brake mechanism preventing backward rotation of the planetary gear carrier may be released when the driven shaft reaches or exceeds the speed of the driver and this movement of the brake disengaging position may be effected by the operator's partial deceleration of the engine temporarily so as to give the driven shaft a chance to reach the speed of the driver as by the operator's partial closure of the throttle valve of the engine. Consequently, when the vehicle is in second speed and the driver wishes to go into high speed or direct drive, he partially decelerates the engine and allows the driven shaft to synchronize with the driving element of the gear and in doing so release the planet carrier from the automatic brake mechanism and the high speed automatic clutch mechanism then operates to lock the planet carrier to a drum 107 which is then connected in driving relation with the shaft 41 and the vehicle is then in high gear.

While any suitable automatic clutch mechanism may be used for this purpose I prefer to use the automatic governor operated spring clutch shown in my application Ser. No. 515,219 filed Feb. 12, 1931 and similarly associated. Referring to Figs. 1 and 7 this clutch includes the coiled spring clutch element 108, one end of which is anchored in the disk 51 of the planetary gear carrier and the other end 109 of which is free and adapted to be engaged by a cam projection 110 on an oscillatory equalizer member 111 which is mounted to turn on a part of the hub 54 of the planet carrier. This equalizer has diametrically disposed rounded projections 112 which work in slots 113 of oppositely disposed governor weights 114 that are mounted within the drum 107 and slidably keyed to diametrically disposed guide blocks 115 that are secured by rivets 116 to disk 51. These weights are normally restrained from outward movement by the usual governor springs (not shown). The spring 108 is retained in release position by diametrically disposed pins 117 projecting from the blocks 115 and another set of pins 118 secured to the disk. The weights 114 have slots 119 affording clearance for the pins 117 and also clearance slots 120, one of which allows the free end 109 of the spring to engage the projection 110.

It is now noted that so long as the planetary gear carrier stands still, the weights 114 do not move. When, however, the operator of the vehicle decides that he is going fast enough in gear and wishes to change to high gear he brings about a synchronization of the drive and driven shafts so as to permit the release of the automatic brake mechanism of the planetary carrier and allow it to rotate with its driven gear 48, thereby causing the weight 114 to move outwardly under the action of centrifugal force and against the resistance of their springs and thus turn the equalizer 111 in a direction to press outwardly against the end 109 of the spring 108 and thus move the coils of said spring into clutched engagement with drum 107 so that the epicyclic gear train then revolves as a unit with the drive shaft 20 through the clutch mechanism previously described and the vehicle is then in direct drive or high gear. While this action of the high speed automatic clutch requires a synchronization of the speeds of the drive and driven shaft it does not require any normal shifting of gears by the operator.

When the vehicle is in high or direct drive, if its speed is diminished or slows down to such an extent as to permit the springs for the weights 114 to retract the same and thus release the clutch spring 108, the one way automatic brake including the rollers 96 will again hold the planetary gear carrier stationary and the vehicle will then proceed in second gear and a further reduction in speed will cause the weights 82 of the second speed clutch to move to contracted position and hence release the spring clutch 81 from the drum 80 and the vehicle will then proceed in low gear.

Furthermore, since, in the shifting from second to high, the planet carrier runs ahead of its drive, the spring clutch 108 can slip and thus prevent a violent grabbing action to the drum 107.

It is sometimes highly desirable in driving to change immediately from high to second and in order that the operator, with the present automatic shift, may not have to wait for a reduction in speed of the vehicle to effect this change, means have been provided under the control of the operator, for immediately placing the vehicle in second gear. For this purpose, the hub of the drum 107 is substantially free to revolve on the shaft 41 and carries a clutch gear or jaw clutch member 121 which is engaged by a clutch gear or jaw member 122 whose hub is keyed to the shaft 41 by the splines 123 and hence a shifting of jaw clutch 122 under manual control, out of mesh with its companion gear will release the high speed clutch mechanism from the driven shaft and hence allow the vehicle to proceed immediately in second gear regardless of the engagement at that instant of the automatic high speed clutch.

After the clutch members 121 and 122 are again engaged and the drum 107 is in driving engagement with the driven shaft, the operator may proceed as initially described to put the vehicle in high gear.

For effecting the reverse drive through the epicyclic gear train, means have been provided for holding the shaft 34 against rotation while allowing the planetary carrier to rotate freely and for controlling the one-way brake mechanism of the planetary carrier to allow its reverse rotation.

For holding the shaft 34 against rotation, reference is now made to Figs. 1, 4 and 5 wherein it will be noted that a part of hub portion of the member 39 is provided with spaced teeth 124 to provide a stationary jaw clutch member which is adapted to be alined with a companion clutch gear or jaw clutch member 125 which is riveted or otherwise suitably secured to the disk 84 which as has been noted is splined to the shaft 34. A movable control or clutch member 126 which has internal teeth meshing with the teeth 124 and hence with those of member 125, will when moved into position for reverse lock the disk 84 and shaft 34 against movement since member 39 cannot rotate because it is secured to the transmission housing by the bolts 40.

For releasing the one-way brake mechanism of the planetary gear carrier, I have provided means shown in Figs. 1 and 5 for allowing the brake drum 95 of this brake mechanism to rotate freely and thus prevent the rollers 96 from having any braking effect. For this purpose the brake drum 95 has a toothed face 127 forming a clutch gear or jaw clutch member whose teeth are adapted to be meshed with similar toothed portions 128 formed on one end of the movable clutch member 126. The attaching flange portion of the member 39 is cut out at radially spaced intervals, as indicated at 129, to allow the toothed portions 128 to mesh with the teeth 127 while the member 126 is recessed at radially spaced intervals, as indicated at 130, to accommodate the flanged lug-portions 131 of the member 39 thus provided. With this arrangement since members 39 and 126 do not rotate, when teeth 128 are in mesh with the toothed face 127 of the brake drum 95, this drum cannot rotate and this is the condition for forward drive. When however the clutch member 126 is moved toward the left to disengage this brake drum clutch, as when said member 126 is moved along the teeth 124 to put the transmission in neutral or is moved to bring it into clutched engagement with the clutch gear 125 for reverse, then the brake drum 95 will be free to turn and hence the planetary gear carrier will be free to turn in either the neutral or reverse condition of the transmission.

In order to prevent creeping action of the vehicle when the transmission is in neutral, to prevent the movement of the control lever 166 hereinafter described when the vehicle is in second or high gear, and to permit racing the engine and applying the torque through the gearing as hereinafter described, means have been provided associated with the governor weights 82 and the movable clutch or control member 126 as more particularly shown in Figs. 1 and 3. A thrust plate 132 is mounted to revolve freely in an annular recess 133 in the member 126 and has laterally extending hollow pins 134 secured thereto and having heads 135 secured to or formed integral with the inner end of said pins, said pins being guided in slots 136 formed in the guides 89 and held in a release position by springs 137 seated in the bores of said pins and in the seats of plugs 138 secured to said guides 89. Clearance recesses 139 formed in the weights 82 and conforming to the contours of the heads 135 permit the free movement of the weights 82, when the parts are in the position as shown in Fig. 1 with the transmission in condition for forward drive, but, when the control member 126 is shifted toward the disk 84, either for neutral or reverse, then the pins 134 will be moved over the weights and their heads 135 moving into the seats 90 will prevent outward movement of the weights so that the second speed clutch mechanism is rendered inoperative. Also when the parts are in the position shown in Fig. 1 and the transmission is either in second or high gear the weights 82 will have been moved outwardly so that the slots 90 are out of line with the heads 135 of the pins 134 and consequently the operator cannot move the member 126 to put the transmission in either neutral or reverse. Furthermore, locking out the second speed governors while the transmission is in neutral permits racing the engine and the application of its full torque through the first or low speed of the transmission.

It is sometimes desirable to maintain the vehicle in second so as to permit the engine to act as a brake while descending steep grades and also it is desirable under certain other conditions met with in driving to hold the planetary gear carrier against rotation where the transmission is in neutral and the second speed gearing is prevented from operating through the locking of the governor weights 82 and in either of these situations I have provided a manually controlled brake mechanism for holding the planetary gear carrier against rotation which is shown in Figs. 1, 7 and 11. This mechanism includes a brake drum 140 having flanged portions 52 secured to the disk 51 of said carrier by the bolts 53, a brake band 141 of conventional form of the external extracting type, one end 142 adjustably secured to a bolt 143 pivotally connected to one arm of a lever 144 fixed to a shaft 145, the other arm of said lever being connected to the other end 146 of said band by pin 147, the band being of the lined spring metal type held in a release position by the adjustable stop screws 148, an actuating lever 149 being secured to the shaft 145 and which on actuation swings the lever 144 counterclockwise to reduce the effective distance between the ends of the band to apply the brake to the drum 140.

It is known that with a planetary type transmission, when the driven gear drives the driver, the planetary carrier revolves in the same direction as that of the driver and by the use of the brake above described, when the drum 107 is released from the driven shaft 41 under conditions of forward drive, thus putting the vehicle in second speed, this speed may be maintained as long as desired by the application of the brake band 141 to the drum 140.

There are some occasions when a vehicle has to negotiate difficult or uneven ground when it is necessary to utilize all the available torque of the engine in low gear as for example to get one or more of the wheels out of a hole or depression and on such occasion the member 126 is shifted to put the transmission in neutral and thus lock the governors 82 of the second speed clutch and prevent its operation and then, after idling the engine, to race the engine to build up torque and while it is in this condition gradually apply the band 141 to the drum and apply the power to the gears and then hold the planetary carrier and deliver the full torque of the engine through the low speed of transmission to the shaft 41. This is practically impossible to accomplish with an automatic clutch without a foot throw out control because as soon as the engine reaches a certain predetermined speed the clutches hold before the maximum torque of the engine can be built up or availed of. Thus with this construction it is possible to drive in first speed with the same effect as if the driver had a positive foot controlled clutch and he may drive in first speed without the automatic second and high speed clutches. After this operation however, in order to again bring the transmission into condition for normal driving, the brake 140 is released, the vehicle stopped and the member 126 shifted into the position shown in Fig. 1 for normal forward driving.

The controls for putting the vehicle into running position, into second gear directly while travelling in high gear, into reverse, and for holding the vehicle in second gear will now be described.

Referring to Figs. 7 to 11 the numeral 150 designates the dash of the vehicle and 151 an engager, the same being a rod slidably and rotatably mounted in a casing 152, secured to the instrument panel of the dash and working through an opening 153 in said dash and provided with a handle 154. The casing projects from the front of the panel and has a longitudinal slot 155 in its upper side with notches communicating therewith and designated by the letters F, N and R for forward, neutral and reverse which are plainly visible to the operator. The engager 151 carries a pin 156 adapted to be engaged in any one of the notches and has a flat side 157 so that when the same is in any one of its positions in register with a notch it will be releasably held therein by detent 158 slidably mounted in a bore in a boss on the casing 152 and urged against the engager by a spring 159 mounted in said casing. The engager may be released from any one of its positions by turning the same to move the pin out of one of the notches and to a position to bring said pin into line with slot 155 and then moving it forward or backwardly and thereafter turning it to engage in the desired notch.

The engager 151 is pivotally connected to a lever 160 pivoted at 161 to a bracket on the dash and since it or a part of it is to be turned, it has a suitable swivel joint connection 162 (not shown in detail) formed between relatively rotatable parts of it. The lever 160 is operatively connected by a link 163 to a crank arm 164 on a control shaft 165 journalled in the casing section 23 and carrying a forked shifter member 166 whose ends work in an annular groove 167 in the clutch or control member 126, see Fig. 1.

A second control shaft 168 is journalled in bosses in the casing section 25 and carries a forked shifter member 169 whose ends work in an annular groove 170 in the clutch member 122.

The control shaft 165 as shown in Fig. 11 has a crank arm 171 mounted on one of its outer ends and operatively connected by a link 172 to a crank arm 173 loose on the shaft 168 and carrying an adjustable lug in the form of a screw 174 engageable with a lug 175 on a collar secured to the shaft 168 and thus providing a lost motion operating connection permitting movement of shaft 168 either by or independent of the shaft 165.

The shaft 168 has arm 168' secured thereto provided with a lug 176 adapted to be engaged by an adjustable screw 177 mounted in a boss on the hub of a lever 178 loose on said shaft 168, one arm of said lever being operatively connected by a link 179 to the lower arm of a pedal 180 pivoted on a stud shaft 181 secured to the transmission casing. This provides a lost motion connection between the pedal 180 and the shaft 168 so that this shaft may be operated by or independently of the pedal. This arm 168' also has a part connected by a spring 176' to the casing which acts through said arm to normally turn said shaft 168 to bring the clutch members 121 and 122 into engagement. The other arm 182 of the lever 178 is preferably connected by a ball and socket connection 183 with one end of a link 184 which has a similar connection 185 at its other end with a brake lever 149. The regular brake pedal 186 for the wheel brakes of the vehicle, as indicated in Figs. 7 and 11, is mounted to turn on the shaft 181 and its hub carries a wheel brake operating arm 187 adapted to be held by suitable tension means not shown in a release position in which its stop screw 188 engages the stop lug 189.

From the above described arrangement when the engager is in forward position, the control shaft 165 has been turned to move shifter fork 166 toward the right to bring the member 126 into the position shown in Fig. 1 at which time the teeth 128 and 127 are engaged so that brake drum 95 is held against movement. At the same time the spring 176' has acted to turn the control shaft 168 to move shifter fork 169 to the left and bring clutch gear 122 into engagement with clutch gear 121 and under these conditions the transmission is in position for forward drive. If now the operator, while proceeding in high, desires to go into second gear, without changing the speed of the vehicle while in high, he presses down on the foot pedal 180 sufficiently to cause the same to oscillate shaft 168 through an angle which will move shifter fork 169 toward the right sufficiently to disengage the clutch members 121 and 122 and the vehicle is then in second and if he desires to remain in second he continues to move the pedal 180 farther down which, through the link 184 and lever 149, applies the brake band 141 to the drum 140 to hold the vehicle in second. It is to be noted here that while the interconnection of the brake operating lever 149 with the pedal 180 is the preferred arrangement a separate control lever similar to those used for emergency brakes may be connected to the brake lever 149 if desired.

When the operator shifts the engager 151 into the neutral position, the shaft 165 turns the shifter fork 166 to move the member 126 toward the left and thus release the teeth 128 from the teeth 127 to allow drum 95 to rotate freely and at this same time this movement through cranks 171 and 173, link 172, screw 174 and lug 175 turns shaft 168 and the shifter fork 169 to shift clutch member 122 out of engagement with clutch member 121 and under these conditions as previously described the brake 141 may be applied to the drum 140 by the operator's pressing down on pedal 180.

When the operator shifts the engager 151 from neutral into reverse position the shaft 165 turns shifter fork 166 further toward the left as viewed in Fig. 1 and brings the teeth of member 126 into mesh with the clutch gear 125 thus locking the shaft 34 and hence gear 35 against rotation. At the same time this movement of shaft 166 will through the connection previously described move the shaft 168 and turn the fork 169 farther toward the right and thus move clutch member 122 farther toward the right.

From the foregoing it will be noted that I have provided mechanism for operating the control shaft 168 both from the engager and pedal 180 without interfering with each other.

When the vehicle is standing on a hill or is in a position where it may roll backwards when the transmission is in position for forward drive in order to prevent such backward movement I have provided an automatic one way brake similar to the automatic one way brake for the planetary gear carrier and similar to that of my prior application Ser. No. 515,219. This brake includes a drum formed by the inner face of the member 39, rollers 190 engageable with the drum under the action of an actuator 191 having a splined connection at 192 with the end of the hub member 84' which is secured to the shaft 34. This connection is different from that of the previous case in that as shown in Fig. 4 the splines 193 on the hub 84' work in slots 194 in the actuator which provides a certain amount of lost motion connection between these parts. For forward drive the rollers 190 are automatically released but, when through a tendency of the vehicle to drive the engine through the transmission, the shaft 34 is rotated in a reverse direction, the rollers 190 engage the member 39 which is stationary and prevent this action and the vehicle is therefore prevented from moving backwardly. In some instances when this brake mechanism operates as where the front wheel of the vehicle is run up against a curb and pressure is built up against the teeth of the transmission gears it is almost impossible, in the prior construction with this no roll back brake in applied position to release the jaw clutches of the transmission from their forward position to move them into a position for reverse, but by providing the lost motion connection between the disk 84 and the actuator 191 through the splines 193 as above described this difficulty has been overcome.

The transmission runs in oil so that all parts receive adequate lubrication and in Fig. 1 it will be noted that the planet gear shaft 57 is hollow and connects by ducts 195 with the bearings for the planet gears and by a duct 196 with the bore 36 and thence by a duct 197 with the bore 33.

The general operation of the transmission and its control by the operator is very simple. With the vehicle at rest and the engager 151 in neutral position, the operator starts the engine in the usual manner. After the engine has run for a period sufficient to warm it up, it is throttled down to idling speed and the operator shifts the engager from neutral to forward position where it stays under all ordinary conditions of driving. The operator then proceeds from first to second gear automatically and from second to high as has been described in connection with the automatic clutch mechanism. If under such conditions of driving while the operator is proceeding in high gear, he wishes to immediately proceed in second, he pressed his foot down on the pedal 180 to release the drum 107 from the driven shaft 150

41 and the vehicle proceeds in second gear. If while driving down hill he wishes to use the engine as a brake, he holds the vehicle in second gear by first putting the gear in second through the operation of the pedal 180 and continuing to press down on the same to apply the brake member 141 to hold the planetary gear carrier against rotation. His changing from second to high under ordinary conditions of driving is accomplished as heretofore described. If he desires to reverse the vehicle he moves the engager 151 to reverse position when the car is standing still and then the engine is connected to drive the transmission in reverse. If he gets into a bad hole he moves the engager to neutral position and on racing his engine applies the brake 141 as previously described.

Where under certain conditions the engine starts hard, as in cold weather, if he leaves the transmission in forward and the vehicle is pushed or pulled by another car in a forward direction at the rate of five to ten miles an hour, the high speed clutch first expands to connect the driven shaft 41 with the planetary gear carrier and then the second speed clutch comes into operation and brings about a gradual pull on the flywheel which in turn starts the engine shaft 20 revolving, giving the same effect as hand cranking.

The automatic clutch that starts the engine with the shaft 30 of the transmission is of course designed so that it will keep the engine in clutched engagement with the transmission when the engine is operating at any driving speed so as to keep the transmission in gear. This automatic clutch however is designed to be in disengaged position at the idling speed of the engine and it is also to be understood that certain features of this invention are not dependent upon the use of an automatic clutch but that any suitable clutch may be used between the engine and the transmission.

A cover plate 198 is removably secured over a large opening 199 in the casing section 23 and through which access may be readily had to the parts in this section.

I desire it to be understood that this invention is not to be limited to any particular form or arrangement of parts except in so far as such limitations are included in the claims.

What I claim as my invention is:

1. In a power transmission mechanism, the combination with the engine shaft and flywheel, of a drum mounted on said flywheel, a pair of drive shafts, a driven shaft, a planetary gear unit between said drive shafts and driven shaft including drive gears, a driven gear, a planetary gear carrier and planet gears on said carrier, clutch mechanism for connecting the engine shaft with one of said drive shafts, a drum on the flywheel, a coiled spring clutch member for engaging said drum, speed responsive means mounted on the other one of said drive shafts for actuating said clutch member, a drum on said driven shaft, a coil spring clutch member connected to said planetary gear carrier, and speed responsive means on said driven shaft operable on a temporary reduction in speed of said engine drive shaft relative to said driven shaft to actuate said last named coiled spring clutch member for direct connection between said engine shaft with said driven shaft through said gearing unit and the parts connected by said spring clutch members.

2. In a power transmission mechanism, the combination with an engine shaft and flywheel, of a drum mounted on said flywheel, a pair of drive shafts, a driven shaft, a single multi-speed planetary gear unit between said drive shafts and said driven shaft, clutch mechanism connecting said engine shaft with one of said drive shafts to drive said driven shaft through the low speed gear ratio of said unit, speed responsive clutch mechanism including a coiled spring clutch element engageable with said drum for connecting the engine shaft independent of said first named clutch mechanism to the other of said drive shafts to drive said driven shaft through the second speed gear ratio of said unit, and speed responsive clutch mechanism for connecting said gear unit to rotate with said drive shafts and driven shaft for direct drive.

3. In a vehicle transmission mechanism, the combination of a pair of drive shafts, a driven shaft, a variable change speed gear unit between said drive shafts and said driven shaft, control mechanism for said unit, a one way automatic brake mechanism associated with one of said shafts to prevent a backward rolling movement of the vehicle, and a lost motion connection between a part of said brake mechanism and the shaft with which it is associated to permit free operation of said control mechanism when said brake mechanism is effective.

4. In a vehicle transmission mechanism, the combination of a drive shaft, a driven shaft, variable change speed gearing between said shafts, clutch mechanism operable to establish different speed ratios through said gearing including a second speed clutch and speed responsive means for operating said clutch, and means for preventing operation of said speed responsive means regardless of engine speed and when the transmission is in neutral.

5. In a vehicle transmission mechanism, the combination of a drive shaft, a driven shaft, change speed planetary gearing between said shafts including a planetary gear carrier, clutch mechanisms operable to establish the different speed ratios of said gearing including a second speed clutch and speed responsive means for operating said clutch, means for preventing operation of said speed responsive means when the transmission is in neutral, and means for holding the planetary gear carrier stationary while in neutral and said second speed clutch mechanism is prevented from operating for utilizing the full torque of the engine in first speed through said gearing to drive said driven shaft.

6. In a power transmission mechanism, the combination of a drive shaft, a driven shaft, change speed planetary gearing between said shafts including a planetary gear carrier, automatic clutch mechanism for connecting said carrier with the driven shaft for direct drive, automatic brake mechanism for the planetary gear carrier when said gearing is functioning including brake members, and a relatively stationary drum, a rotary member for simultaneously releasing said brake members, and speed responsive means carried by said carrier for actuating said rotary member to release said brake members when said carrier is rotating with said shafts for direct drive.

7. In a power transmission mechanism, the combination with a drive shaft, a driven shaft, change speed planetary gearing between said shafts including a planetary gear carrier, clutch mechanisms operable to establish the different speed ratios of said gearing including a second speed clutch and speed responsive weights for operating said clutch, means for preventing operation of said weights, automatic brake mechanism for the planetary gear carrier to prevent its rotation while in gear, and means for releasing said automatic brake mechanism to put the transmission in neutral, said last named means also controlling the means for preventing operation of said weights.

8. In a power transmission mechanism, the combination of a drive shaft, a driven shaft, change speed planetary gearing between said shafts, including a planetary gear carrier, clutch mechanisms operable to establish the different speed ratios of said gearing including a second speed automatic clutch mechanism operable on an increase in speed of the drive shaft, automatic brake mechanism for the planetary gear carrier, and control means to lock said second speed clutch mechanism and release said automatic brake mechanism in the neutral position of the transmission.

9. In a power transmission mechanism, the combination of a drive shaft, a driven shaft, change speed planetary gearing between said shafts including a planetary gear carrier, clutch mechanism to establish the different speed ratios of said gearing including a second speed automatic clutch mechanism operable on an increase in speed of the drive shaft including speed responsive elements, automatic brake mechanism for the planetary gear carrier including a brake drum, a manually operable clutch for holding said brake drum stationary for forward drive and operable to release said drum in the neutral position of the transmission, and locking means for said speed responsive elements operable by said manually operable clutch to hold said elements against movement in the neutral position of said transmission.

10. In a power transmission mechanism, the combination of a pair of concentric drive shafts, a driven shaft, a stationary support, a planetary gear unit between said shafts including a planetary gear carrier having a hub portion journalled in said support and carrying one end of said shafts, automatic clutch mechanism for establishing a driving relation with either of said drive shafts, automatic brake mechanism for preventing reverse rotation of said carrier including brake members mounted directly on said hub portion of said carrier and a releasable brake drum, and means for holding said brake drum stationary during operation of said carrier for forward drive.

OSCAR H. BANKER.

CERTIFICATE OF CORRECTION.

Patent No. 1,943,293.   January 16, 1934.

OSCAR H. BANKER.

It is hereby certified that error appears in the printed specification of the above numbered patent requiring correction as follows: Page 7, line 107, claim 4, for "mechanism" read mechanisms; and that the said Letters Patent should be read with this correction therein that the same may conform to the record of the case in the Patent Office.

Signed and sealed this 20th day of February, A. D. 1934.

(Seal)

F. M. Hopkins
Acting Commissioner of Patents.

operating said clutch, means for preventing operation of said weights, automatic brake mechanism for the planetary gear carrier to prevent its rotation while in gear, and means for releasing said automatic brake mechanism to put the transmission in neutral, said last named means also controlling the means for preventing operation of said weights.

8. In a power transmission mechanism, the combination of a drive shaft, a driven shaft, change speed planetary gearing between said shafts, including a planetary gear carrier, clutch mechanisms operable to establish the different speed ratios of said gearing including a second speed automatic clutch mechanism operable on an increase in speed of the drive shaft, automatic brake mechanism for the planetary gear carrier, and control means to lock said second speed clutch mechanism and release said automatic brake mechanism in the neutral position of the transmission.

9. In a power transmission mechanism, the combination of a drive shaft, a driven shaft, change speed planetary gearing between said shafts including a planetary gear carrier, clutch mechanism to establish the different speed ratios of said gearing including a second speed automatic clutch mechanism operable on an increase in speed of the drive shaft including speed responsive elements, automatic brake mechanism for the planetary gear carrier including a brake drum, a manually operable clutch for holding said brake drum stationary for forward drive and operable to release said drum in the neutral position of the transmission, and locking means for said speed responsive elements operable by said manually operable clutch to hold said elements against movement in the neutral position of said transmission.

10. In a power transmission mechanism, the combination of a pair of concentric drive shafts, a driven shaft, a stationary support, a planetary gear unit between said shafts including a planetary gear carrier having a hub portion journalled in said support and carrying one end of said shafts, automatic clutch mechanism for establishing a driving relation with either of said drive shafts, automatic brake mechanism for preventing reverse rotation of said carrier including brake members mounted directly on said hub portion of said carrier and a releasable brake drum, and means for holding said brake drum stationary during operation of said carrier for forward drive.

OSCAR H. BANKER.

CERTIFICATE OF CORRECTION.

Patent No. 1,943,293.　　　　　　　　　　　　　　　January 16, 1934.

OSCAR H. BANKER.

It is hereby certified that error appears in the printed specification of the above numbered patent requiring correction as follows: Page 7, line 107, claim 4, for "mechanism" read mechanisms; and that the said Letters Patent should be read with this correction therein that the same may conform to the record of the case in the Patent Office.

Signed and sealed this 20th day of February, A. D. 1934.

F. M. Hopkins
(Seal)　　　　　　　　　　　　　　　Acting Commissioner of Patents.